United States Patent [19]

Takeo et al.

[11] Patent Number: 4,721,630
[45] Date of Patent: Jan. 26, 1988

[54] PAINTING PROCESS FOR INNER PANEL REGION OF MOTORCAR VEHICLE BODY AND APPARATUS THEREFOR

[75] Inventors: Tadashi Takeo, Sakado; Toru Yamamoto, Saitama, both of Japan

[73] Assignee: Honda Giken Kogyo Kabushiki Kaisha, Tokyo, Japan

[21] Appl. No.: 890,583

[22] Filed: Jul. 30, 1986

[30] Foreign Application Priority Data

| Jul. 31, 1985 | [JP] | Japan | 60-167542 |
| Sep. 18, 1985 | [JP] | Japan | 60-204393 |
| Oct. 4, 1985 | [JP] | Japan | 60-220426 |
| Oct. 9, 1985 | [JP] | Japan | 60-223487 |
| Nov. 28, 1985 | [JP] | Japan | 60-182182 |
| Dec. 3, 1985 | [JP] | Japan | 60-185621 |
| Dec. 4, 1985 | [JP] | Japan | 60-186045 |

[51] Int. Cl.⁴ .............. B05B 13/04; B05B 15/12; B05B 1/02
[52] U.S. Cl. .................... 427/421; 427/424; 118/314; 118/315; 118/323; 118/326; 239/751; 239/752; 901/43
[58] Field of Search ........... 239/752, 751; 118/323, 118/314, 315, 326; 427/421, 424; 901/43

[56] References Cited

U.S. PATENT DOCUMENTS

| 4,239,431 | 12/1980 | Davini | 118/323 X |
| 4,342,535 | 8/1982 | Bartlett et al. | 414/744 A |
| 4,342,536 | 8/1982 | Akeel et al. | 414/744 A |
| 4,362,124 | 12/1982 | Fleig | 118/698 |
| 4,498,414 | 2/1985 | Kiba et al. | 118/663 |
| 4,521,462 | 6/1985 | Smythe | 118/300 |
| 4,532,148 | 7/1985 | Vecellio | 427/31 |
| 4,552,506 | 11/1955 | Cummins et al. | 414/735 |
| 4,630,567 | 12/1986 | Bambousek et al. | 118/323 |

FOREIGN PATENT DOCUMENTS

| 3301022 | 7/1984 | Fed. Rep. of Germany | 901/43 |
| 56-144763 | 11/1981 | Japan . | |

*Primary Examiner*—Shrive P. Beck
*Attorney, Agent, or Firm*—Armstrong, Nikaido, Marmelstein & Kubovcik

[57] ABSTRACT

In the first embodiment of this invention, an inner panel portion of a front door region of a vehicle body and an inner panel portion of a rear door region of a vehicle body on each side of a 4-door type vehicle are painted respectively by a pair of front and rear painting robots located on side portions of a painting stage. In the second embodiment, an inner panel portion of the door region of a vehicle body on each side of a 2-door type vehicle is painted by dividing into halves the area to be painted by the front and rear painting robots on each side of the vehicle.

10 Claims, 13 Drawing Figures

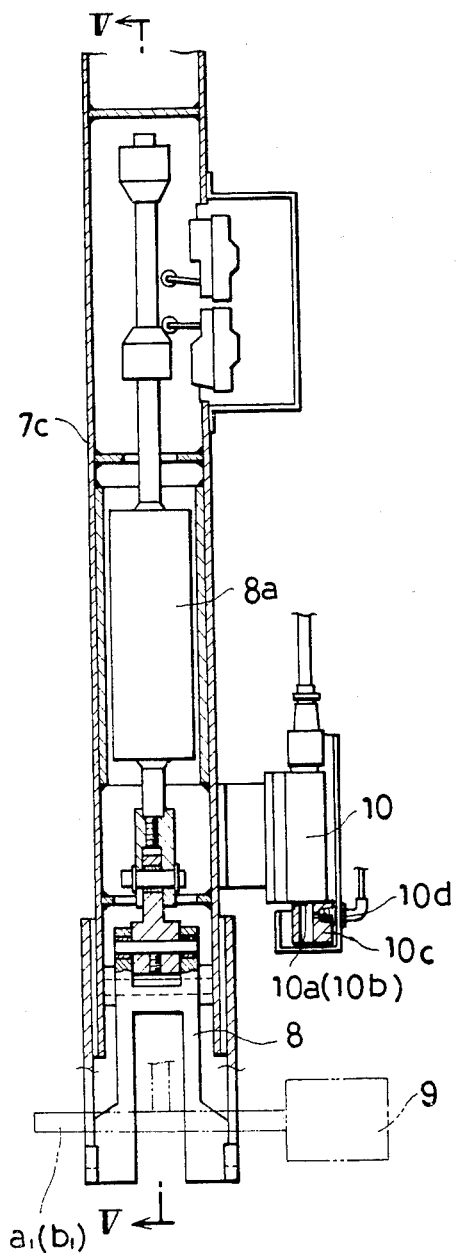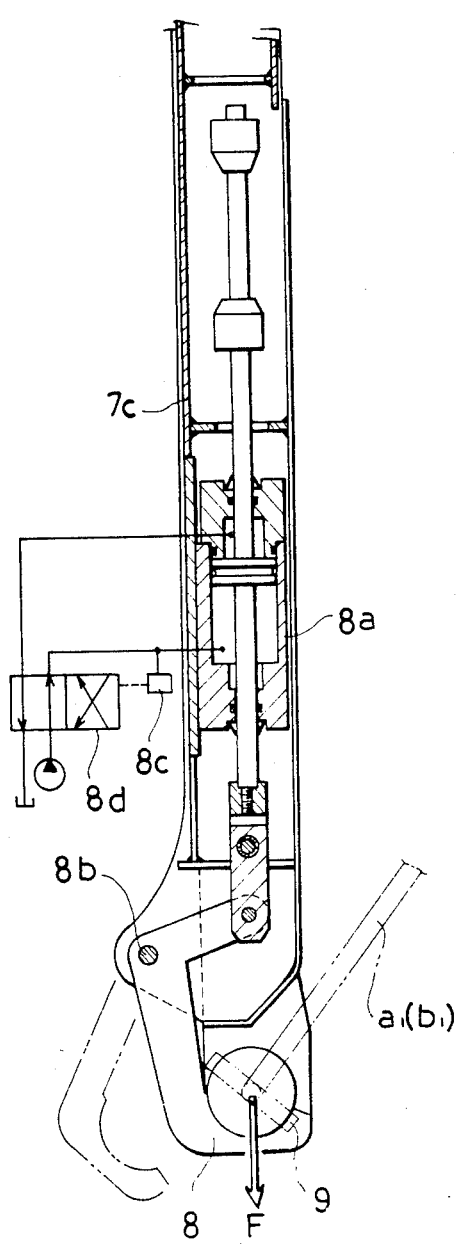

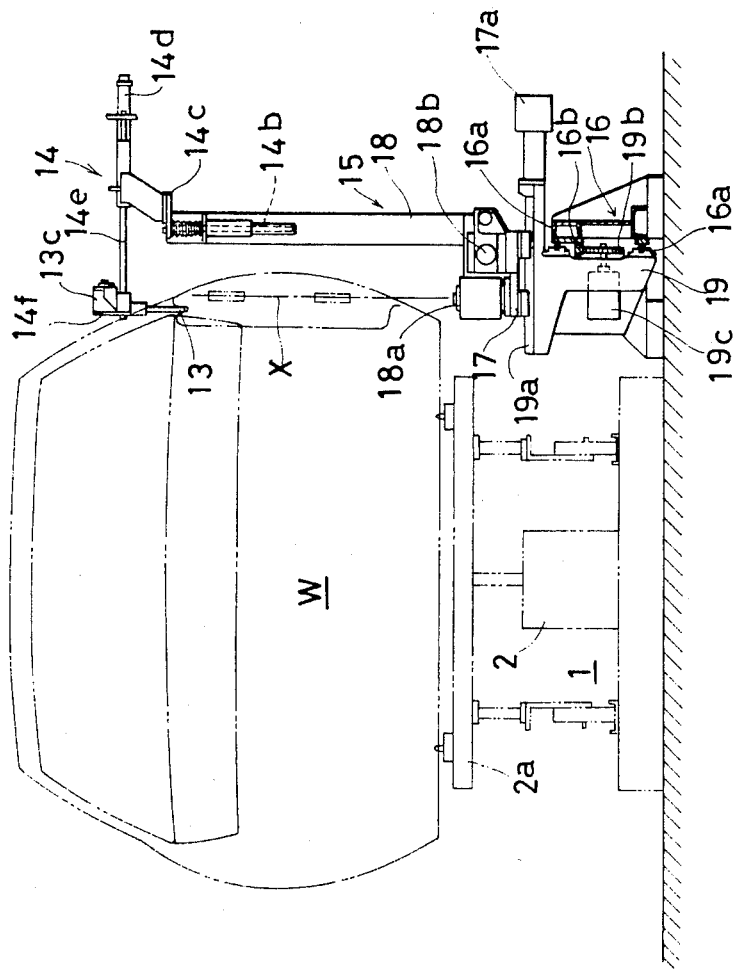

PAINTING PROCESS FOR INNER PANEL REGION OF MOTORCAR VEHICLE BODY AND APPARATUS THEREFOR

BACKGROUND OF THE INVENTION

This invention relates to a painting apparatus and process for painting inner panel regions of a motorcar vehicle body. The regions to be painted include (a) an inner panel portion in the front region of the vehicle body that includes an inner surface of a front lid such as a hood or the like, (b) an inner panel portion of the rear region of the vehicle body that includes an inner surface of a rear lid such as a trunk lid, a tail gate or the like, and (c) an inner panel portion of a door region on each side of the vehicle body that includes an inner surface of a door and a door trim portion.

One type of painting process for an inner panel region of a 2-door type motorcar vehicle body has been disclosed in Japanese Unexamined Patent Application publication Sho 56-144763. In this disclosure, a motorcar vehicle body is conveyed into a painting area or stage with its doors left open. A pair of front and rear painting robots, which are movable forwards and rearwards, are disposed on the left and right side portions of the painting stage. An inner panel portion of the front region of a vehicle body is painted by the front painting robots, and at the same time, the inner panel portions of the door regions on both the left and right sides of the vehicle body are painted by the rear painting robots. Thereafter, an inner panel portion of the rear region of the vehicle body is painted by the rear painting robots.

A similar painting process for a 4-door type motorcar vehicle body can be carried out by utilizing the foregoing conventional technique. That is, the 4-door type motorcar vehicle body is conveyed into a painting area or stage with its front doors and rear doors remaining open. The first step in painting a vehicle body involves painting an inner panel portion of the front region of the vehicle body by the front painting robots located on the left and right side portions of the painting stage. At the same time, inner panel portions of the rear door regions on both sides of the vehicle body are painted by the rear painting robots located on the body's left and right sides. Thereafter, the second step in painting involves painting the inner panel portions of the front door regions on both left and right sides of the vehicle body. These regions are painted by the front painting robots, and at the same time, an inner panel portion of a rear region of the vehicle body is painted by the pair of rear painting robots.

However, with the foregoing known process and the foregoing possible process, when the vehicle body is conveyed into the painting stage or when the pair of front painting robots is moved in order to carry out the second painting step after completion of the first painting step, the pair of front painting robots must be mostly moved sideways, that is, in the lateral direction, to avoid abutment with the open front doors. Therefore, a problem occurs because the lateral space of the painting stage is increased in accordance to lateral movement of the robots. Also, additional areas or stages must be provided in front of and behind the painting stage for opening the doors. Therefore, the size of the painting process line is increased in the longitudinal direction by these additional stages.

Additionally, when atomizers mounted on respective forward ends of the painting robots are brought close to one another, an electrostatic repulsion is generated by the high voltages applied to the individual atomizers. Thus, it is impossible to achieve a good paint job. Accordingly, in order to avoid this, it is often necessary when the front region or the rear region of the vehicle body is painted to have the atomizers of the pair of painting robots, which are located on the left side and on the right side, brought far apart from each other. One of the robots is once kept inoperative and is positioned away from the other painting robot. Therefore, the working efficiency of the robots is lowered and thus the cycle time is increased.

Additionally, with the foregoing known process for painting the inner panel region of a 2-door type motorcar vehicle body, painting of the inner panel portions of the door regions is carried out only by the rear painting robots. Therefore, the area to be painted by the pair of rear painting robots is much larger than the area to be painted by the front painting robots. Thus, the front painting robots have a lower working efficiency, while the painting working time by the rear painting robots is long which increases the cycle time.

SUMMARY OF THE INVENTION

The first embodiment of this invention solves the foregoing problems in the painting process for painting an inner panel region of a 4-door type motorcar vehicle body. A motorcar vehicle body, with its doors closed, is conveyed into and stopped at a painting stage. The front and rear lids are opened by a lid opening and closing means provided in the front and in the rear of the painting stage. The pair of door opening and closing means each selectively opens and closes a front and a rear door on each side of the vehicle body. A pair of front and rear painting robots which moves forwards and rearwards, is disposed on a left and right side portion of the painting stage. During the first painting step, half of the inner panel portion of the front region of the vehicle body is painted by the front painting robot on one side portion of the painting stage. The rear door on one side of the vehicle body is opened by the door opening and closing means on the one side portion. Thus, the inner panel portion of the rear door region on one side of the vehicle body is painted by the rear painting robot on one side portion. The front door on the other side of the vehicle body is opened by the door opening and closing means on the other side portion. Thus, the inner panel portion of the front door region on the other side of the vehicle body is painted by the front painting robot on the other side portion. Half of the inner panel portion of the rear region of the vehicle body is painted by the rear painting robot on the other side portion. After the completion of the first painting step, the respective open doors are closed by the respective door opening and closing means, and the respective front painting robots are shifted forwards and rearwards to their individual positions. Thereafter, during the second painting step, a front door on one side of the vehicle body is opened by the door opening and closing means on the one side portion and the inner panel portion of the front door region on one side of the vehicle body is painted by the front painting robot. The remaining half of the inner panel portion of the rear region of the vehicle body is painted by the rear painting robot while the remaining half of the inner panel portion of the front region of the vehicle body is painted by the front painting robot on the other side portion. The rear door on the other side is opened by the door opening and closing means on the other side portion and thus the inner panel portion of a rear door region on the other side of the vehicle body is painted by the rear painting robot on the other side portion.

A second embodiment of this invention solves the foregoing problems in the painting process for the inner panel region of a 2-door type motorcar vehicle body. Instead of the painting of the inner panel portion of the rear door region on one side of the vehicle body and the inner panel portion of the front door region on the other side thereof in the first painting step and the painting of the inner panel portion of the front door region on one side of the vehicle body and the inner panel portion of the rear door region on the other side of the vehicle body in the second painting step, painting of half of each of the inner panel portions of the door regions on both sides of the vehicle body is carried out in a first painting step, and painting of the remaining half of each of those inner panel portions thereof is carried out in a second painting step.

Thus, according to the first embodiment of this invention, in the first painting step, the respective halves of the inner panel portion of the front region of the vehicle body and the inner panel portion of the rear region of the vehicle body are painted. In addition, the inner panel portion of the rear door region on one side of the vehicle body and the inner panel portion of the front door region on the other side thereof are painted. In the second painting step, the remaining halves of the inner panel portion of the front region of the vehicle body and the inner panel portion of the rear region thereof are painted. Thus, the painting of the entire inner panel region of the vehicle body is completed upon completion of the second painting step.

During the painting process of this invention, when one of the front painting robots on the left and right side portions is painting the inner panel portion of the front region of the vehicle body, the other thereof is painting the inner panel portion of the front door region of the vehicle body, so that the atomizers of the two front painting robots can be prevented form approaching one another so that they are not within the range which can generate an electrostatic repulsion.

This can also be applied to the rear painting robots on both side portions. Accordingly, it is unnecessary for one of the painting robots to stop its painting operation in order to keep the two atomizers apart. Thus, the working efficiency of each painting robot can be heightened and the cycle time can be shortened.

Additionally, the doors are opened by the door opening and closing means installed in the painting stage, so that any additional stage for opening and closing doors becomes unnecessary and the length of the painting process line can be shortened. Additionally, the vehicle body is arranged to be conveyed into and out of the painting stage with its doors closed, so that it becomes unnecessary to move the painting robots sideways, namely, in the lateral direction at the time the vehicle body is conveyed into and out of the painting areas. Additionally, the front painting robots are shifted forwards and rearwards to their predetermined positions after the completion of the first painting step under the condition that the doors previously opened in the first step are closed, so that the shifting painting robots can be prevented from abutting the doors, and can be shifted to the forward and rearward positions without being retreated sideways. Consequently, it is not necessary to provide any space for laterally moving the painting robots, and therefore the lateral space of the painting stage is decreased.

According to the second embodiment of this invention, the inner panel portions of the door regions on both sides of the vehicle body of a 2-door type motorcar are painted by the front and rear painting robots, such that the area painted by the front painting robots and by the rear painting robots are equal to one another. Thus, the inconvenience of having a cycle time lowered by inefficiency of the front and rear painting robots is avoided.

BRIEF DESCRIPTION OF THE DRAWINGS

Embodying examples of this invention will now be explained with references to the accompanying drawings:

FIG. 4 is an enlarged sectional front view of a forward end portion of an arm of a lid opening and closing means taken along the line IV—IV in FIG. 3, FIG. 5 is a sectional view taken along the line V—V in FIG. 4, FIG. 9 is a front view thereof.

DETAILED DESCRIPTION OF THE PREFERRED EMBODIMENTS

Figure 1:
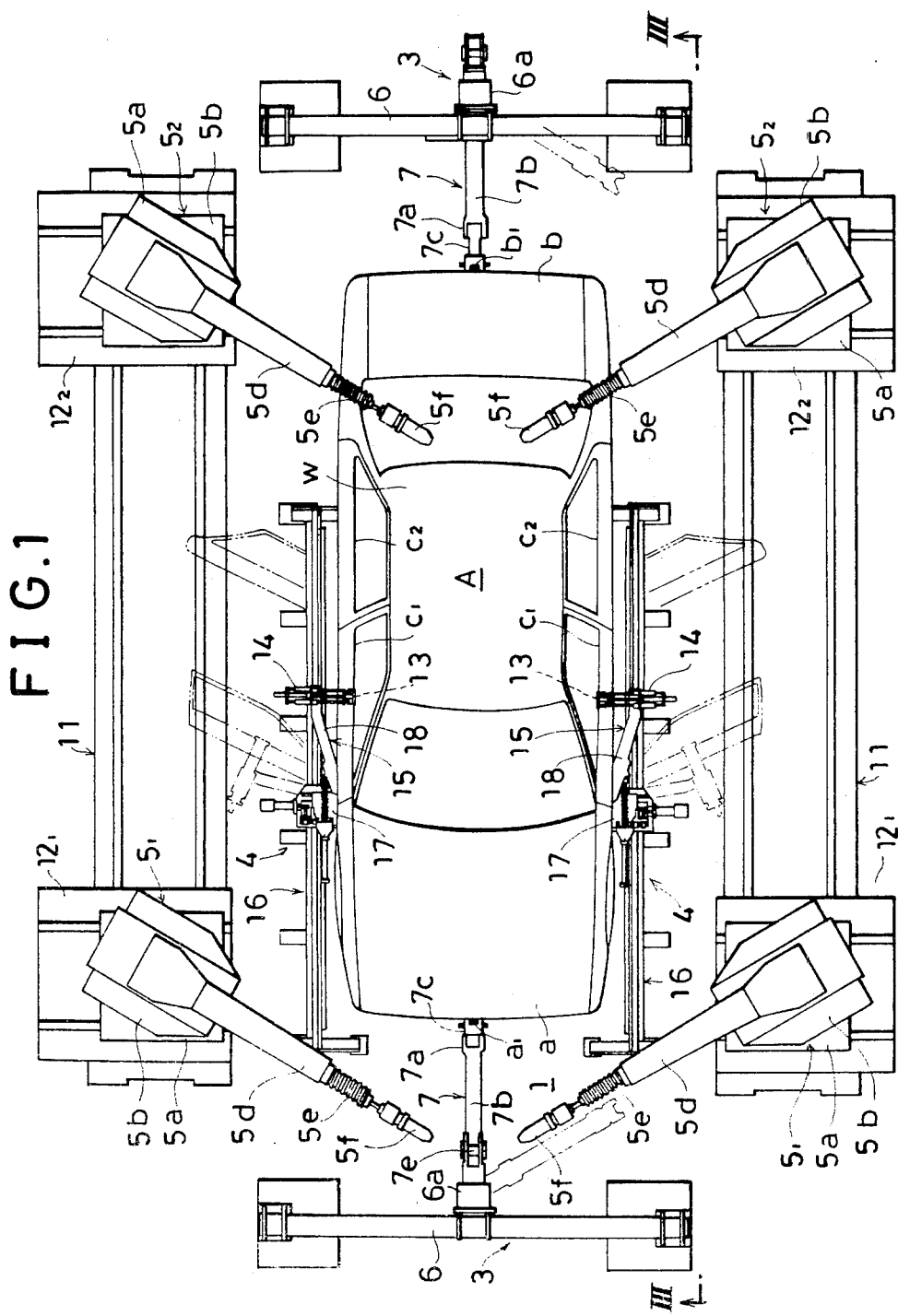
FIG. 1 is a top plan view of a painting stage used in one embodiment of the invention.
Figure 2:
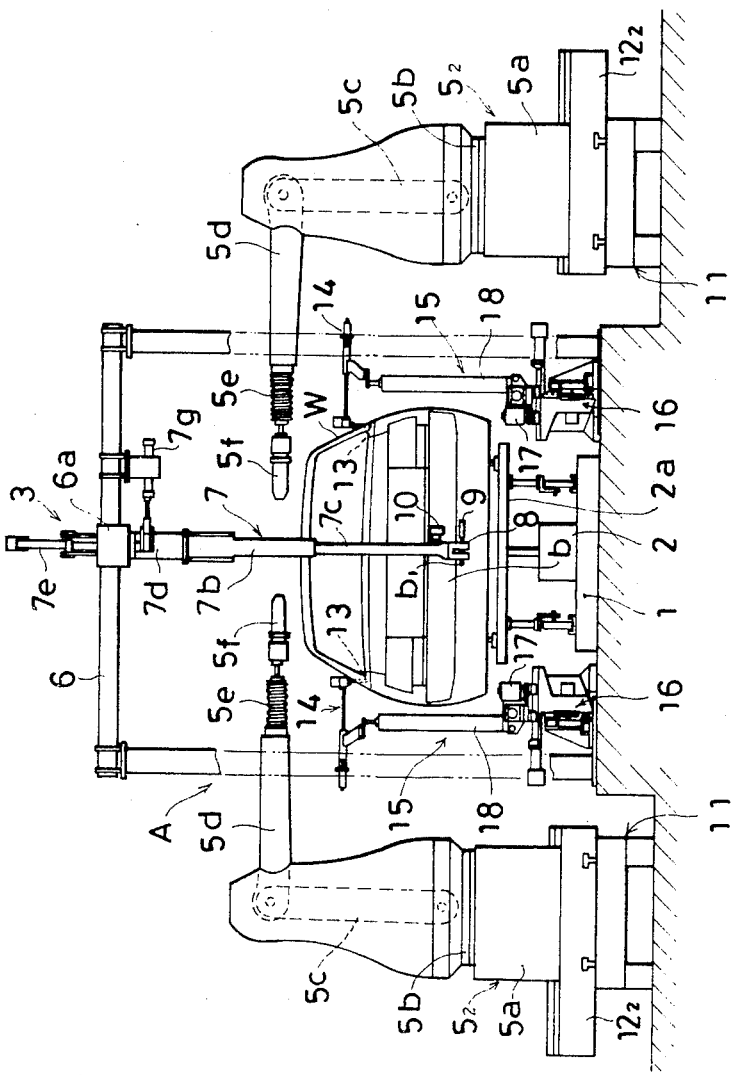
FIG. 2 is a rear side view of the same.
Figure 3:
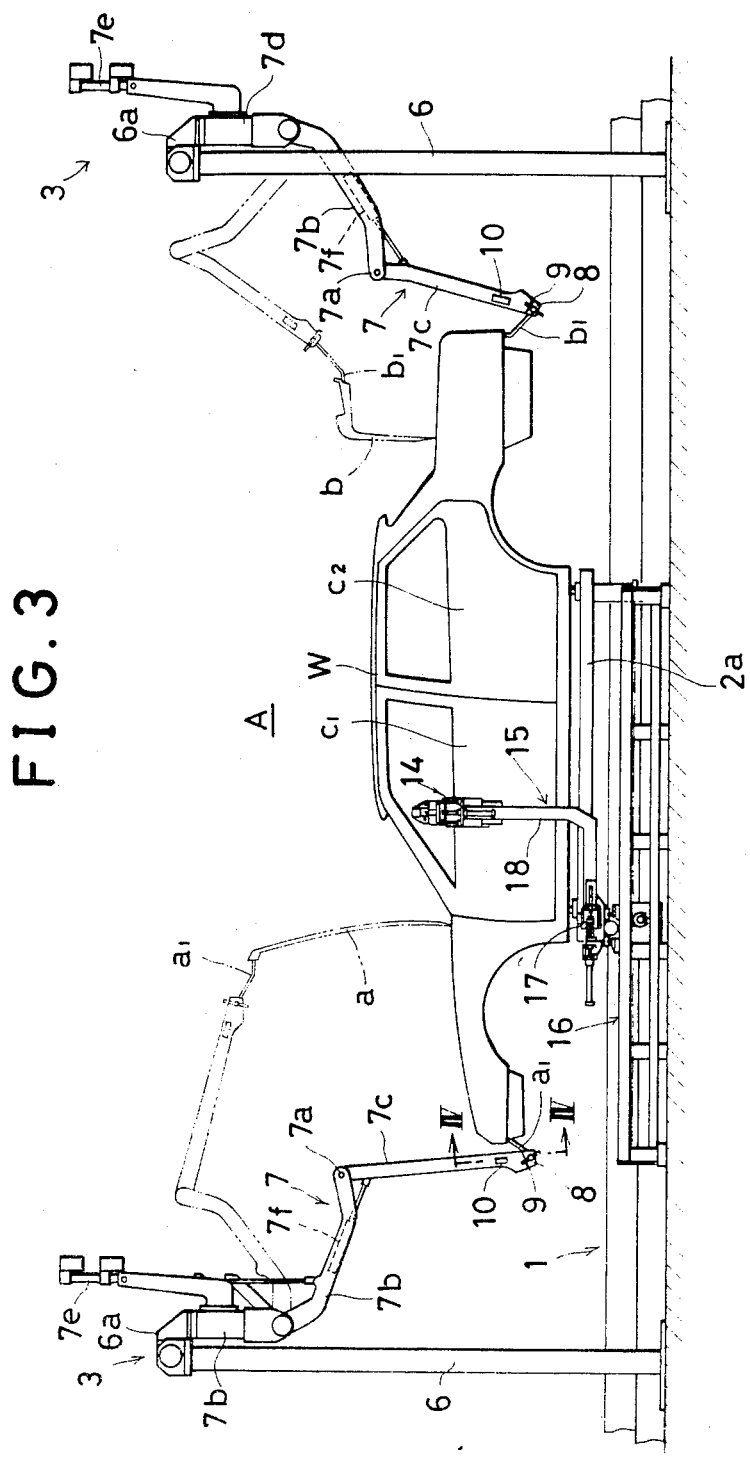
FIG. 3 is a side view, viewed along the line III—III in FIG. 1.

Referring to FIGS. 1-3, numeral 1 denotes a vehicle body conveying passage provided thereon with a conveyer 2 with a carrier 2a for conveying a motorcar vehicle body W. The motorcar vehicle body W is arranged to be stepwise-conveyed along on the conveying passage 1, and to be stopped at a painting stage provided at the midway portion of the conveying passage. When the vehicle body is mounted on the carrier 2a, at a predetermined painting stage A, (a) an inner panel portion of the front region of the vehicle body W, which includes an inner surface of a front lid a constituting a hood, an interior of an engine compartment and others, (b) an inner panel portion of a rear region of the vehicle body W, which includes an inner surface of a rear lid constituting a trunk lid, an interior of a trunk compartment and others, and (c) an inner panel portion of each of the door regions on both sides of the vehicle body W which includes the inner surface of a front door $c_1$ on each side, an inner surface of a rear door $c_2$ on each side and a rim portion of the vehicle body that surrounds each of the front and rear doors $c_1$ and $c_2$ are painted. In the front and rear of the painting stage A, there are a pair of front and rear lid opening and closing means 3, 3 for opening and closing the front lid a and the rear lid b, respectively. On the left and right portions of the painting stage A, there are a pair of door opening and closing means 4, 4 for opening and closing selectively the respective front door $c_1$ and rear door $c_2$. Also on the left and right portions of the painting stage A, there are a pair of front and rear robots $5_1$ and $5_2$.

Each of the respective lid opening and closing means 3, 3 are constructed to be upwardly and downwardly swingable. Arms 7, 7 of means 3, 3 are attached to the upper portions of a gate-shaped machine frames 6, 6 traversing the conveying passage 1. Means 3, 3 are disposed in the front and in the rear of the painting stage A. Arms 7, 7 are provided at their forward ends with holding means 8, 8 for holding handle members $a_1$, $b_1$ previously attached to opening end portions of the respective lids a, b.

Each of the arms 7, 7 comprises a pair of first and second arm members 7b, 7c interconnected through a joint 7a. The first arm member 7b is pivotally provided on an arm holder 7d hung down from a bracket 6a fixed to the machine frame 6 such that arm member 7b is swingable in the upper and lower directions. As shown in FIGS. 4 and 5, a holding means 8 has a bifurcated form for holding the T-shaped handle member $a_1$ or $b_1$. Holding means 8 is pivotally attached to the forward end of the second arm member 7c by being opened and closed by a hydraulic actuator 8a which includes a cylinder. After the holding member 8 is closed and the handle member $a_1$ or $b_1$ is held by the holding member 8, the forward end of the second arm member 7c is moved upwards and downwards along a predetermined arc locus about the hinge of the lid a by (1) a swing movement of the first arm member 7b caused by the cylinder 7e mounted on the arm holder 7d, and by (2) the swing movement of the second arm member 7c about the joint 7a caused by the cylinder 7f provided on the first arm member 7b. Thus, opening and closing of the lid a or b may be carried out.

The arm holder 7d is turnable about a vertical line in relation to the bracket 6a by means of a cylinder 7e provided on the machine frame 6 so that the arm 7 may be movable by the turning movement of the cylinder. The operative position of the arms 7, 7 (shown by solid lines in FIG. 1) is such that the holding means 8 is either positioned above the conveying passage 1 or is positioned on a lateral side of the conveying passage 1 when the arm 7 is in a retreated position (shown by chain lines in FIG. 1). Thus, when the motorcar vehicle body W is conveyed into the painting stage, the arm 7 is moved to the retreated position so that paint or the like will not be dropped from the member 8 and adhered to the vehicle body W. Also during maintenance, the arm 7 is moved to the retreated position so that washing of the holding means 8 or the like may be carried out outside the conveying passage 1.

Figure 6:
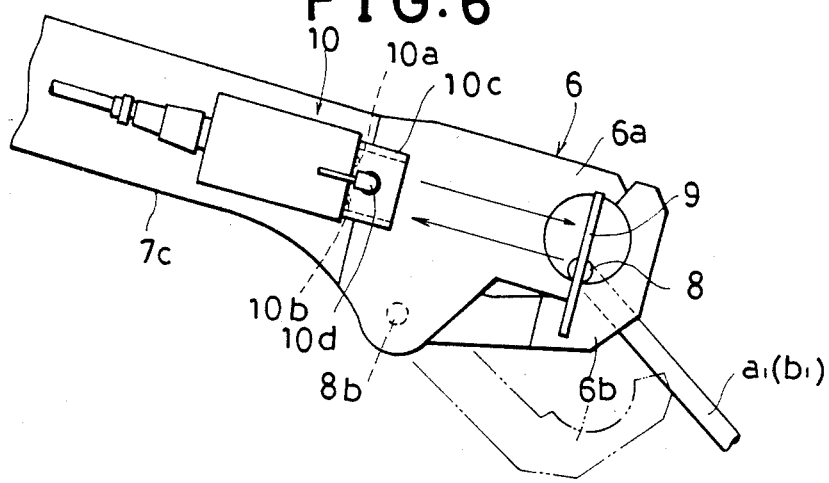
FIG. 6 is an enlarged side view of the forward end of the arm, when the lid is opened.

A detecting member 9 comprising a reflection plate is attached to an end portion of each of the handle members $a_1$, $b_1$. A detecting means 10 includes a photoelectric switch having a light projecting member 10a and a light receiving member 10b. Detecting means 10 is attached to a position on the arm 7 that is near the attaching portion of the holding means 8. When the lid is in an open position, as shown in FIG. 6, the detecting member 9 faces the detecting means 10 so that the optical axis of the detecting member 9 crosses the optical axis of the detecting means 10 at right angles. Thus, the beam of light emitted from the light projecting member 10a is reflected by the detecting member 9 to the light receiving member 10b. Thus, opening of the lid a, b may be detected by the operation of the detecting means 10. Should the handle member $a_1$ or $b_1$ come off from the lid a, b during the lid opening, the arm 7 is swung to the predetermined opening position. However, the handle member $a_1$ or $b_1$ is hung down from the holding members 8, 8 so that the detecting member 9 does not face the detecting means 10. Consequently, the detecting means 10 does not operate. Also, when the holding means 8, 8 comes off the handle member $a_1$ or $b_1$, the detecting means 10 is not operated. In other words, the detecting means 10 is operated only when the lids a, b are actually opened, and thus the opening of the lids a, b can be detected correctly.

In the illustrated example, a tubular cap 10c is attached to a forward end of the detecting means 10. An air piping 10d is connected to the cap 10-c so that, during painting, air may be projected from the cap 10c and thereby preventing any spraying paint from adhering to the light projecting and receiving portions 10a, 10b.

The detecting means 10 may be composed of a proximity switch or a limit switch arranged to cooperate with a dog constituting the detecting member 9.

Additionally, in the illustrated example, a shaft 8b, for pivotally supporting the holding means 8, is provided at a position offset from an acting line of a reaction force F. Thus, during the lid opening operation, the holding means 8 may be given such a moment by the reaction force F acting from the handle member $a_1$ or $b_1$ that causes the holding means to incline towards its opening side about the shaft 8b. In addition, a pressure responsive member 8c causes the holding means 8 to open when a load pressure of the hydraulic actuator 8a is increased above a predetermined value. With this arrangement, when the lid a or b is not opened due to something being wrong, the holding means 8 is opened by an increase in the load pressure caused by an increase of the moment towards the opening side. Thus, the holding means 8 is brought into disengagement from the handle member $a_1$ or $b_1$, and the lid a, b may be free from having any undue force applied.

In the illustrated example, the pressure responsive means 8c comprises a pressure detecting means for detecting the load pressure. When the load pressure is increased above a predetermined value, an actuator control valve 8d may be changed over to its opening side, by a signal from the detecting means.

Each of the foregoing painting robots $5_1$, $5_2$ is composed of a 6-axis robot comprising a turning table 5b turnably provided on a base table 5a, a first arm 5c which is swingably provided thereon, a second arm 5d which is so pivotally attached to an upper end of the first arm 5c as to be swingable in upper and lower directions, and a wrist portion 5e of 3-axis construction provided on a forward end of the second arm 5d. At the front end of the wrist portion 5e, a bell-type atomizer 5f is attached. A pair of front and rear movable tables $12_1$, $12_2$ are supported on a first railway means 11. The first railway means 11 is on a side portion of the painting stage A and is movable forwards and rearwards. The respective front and rear painting robots $5_1$, $5_2$ are so supported, at tables 5a, 5a, on the respective movable tables $12_1$, $12_2$ as to be movable to advance and retreat sideways, that is, laterally.

The respective movable tables $12_1$, $12_2$ are forwards and rearwards, independently movable of each other by individual driving sources (not illustrated). Thus, the front painting robot $5_1$ and the rear painting robot 2 mounted on the tables may be moved forwards and rearwards, independently of each other.

Each of the foregoing door opening and closing means 4, 4 comprises a door opening and closing robot 15 having a hand member 14 carrying an engaging means 13 for engaging the door $c_1$ or $c_2$ on each side of the vehicle body W. The robot 15 is arranged to be movable along a second railway means 16 is provided inside the foregoing first rail means 11 on each side, so that, by moving the robot 15 towards the front door $c_1$ side or the rear door $c_2$, the respective doors $c_1$, $c_2$ may be opened and closed selectively.

The robot 15 comprises a robot main body 17 which is movable forwards and rearwards along the second railway means 16 within a space formed below the motorcar vehicle body W on the painting stage A. A robot arm 18 is raised, in a bent L shaped form, from the robot main body. The arm 18 is swingable laterally in a horizontal direction. The aforementioned hand portion 14 is attached to an upper end of the arm 18.

Figure 7:
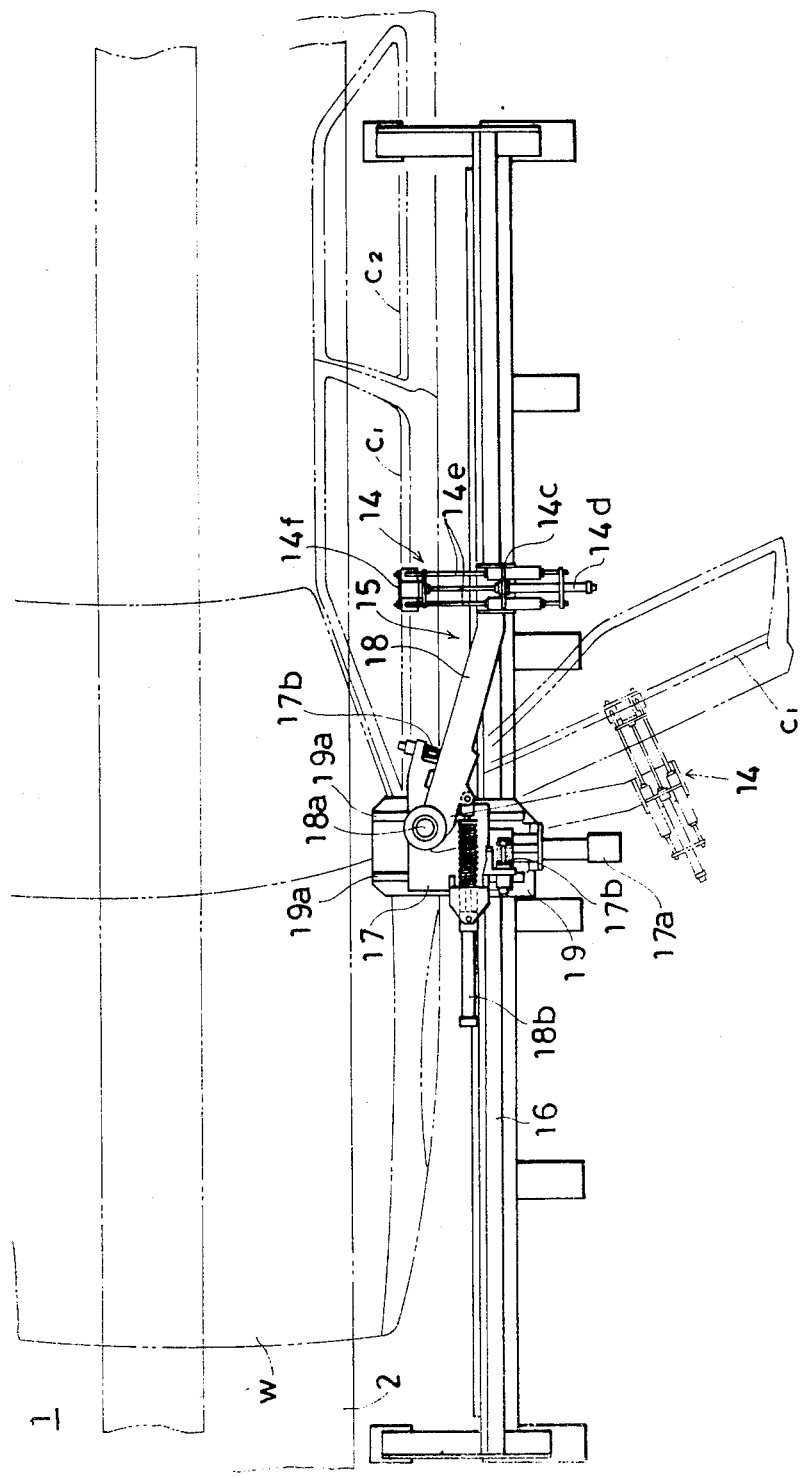
FIG. 7 is an enlarged top plan view of a door opening and closing robot thereof.
Figure 8:
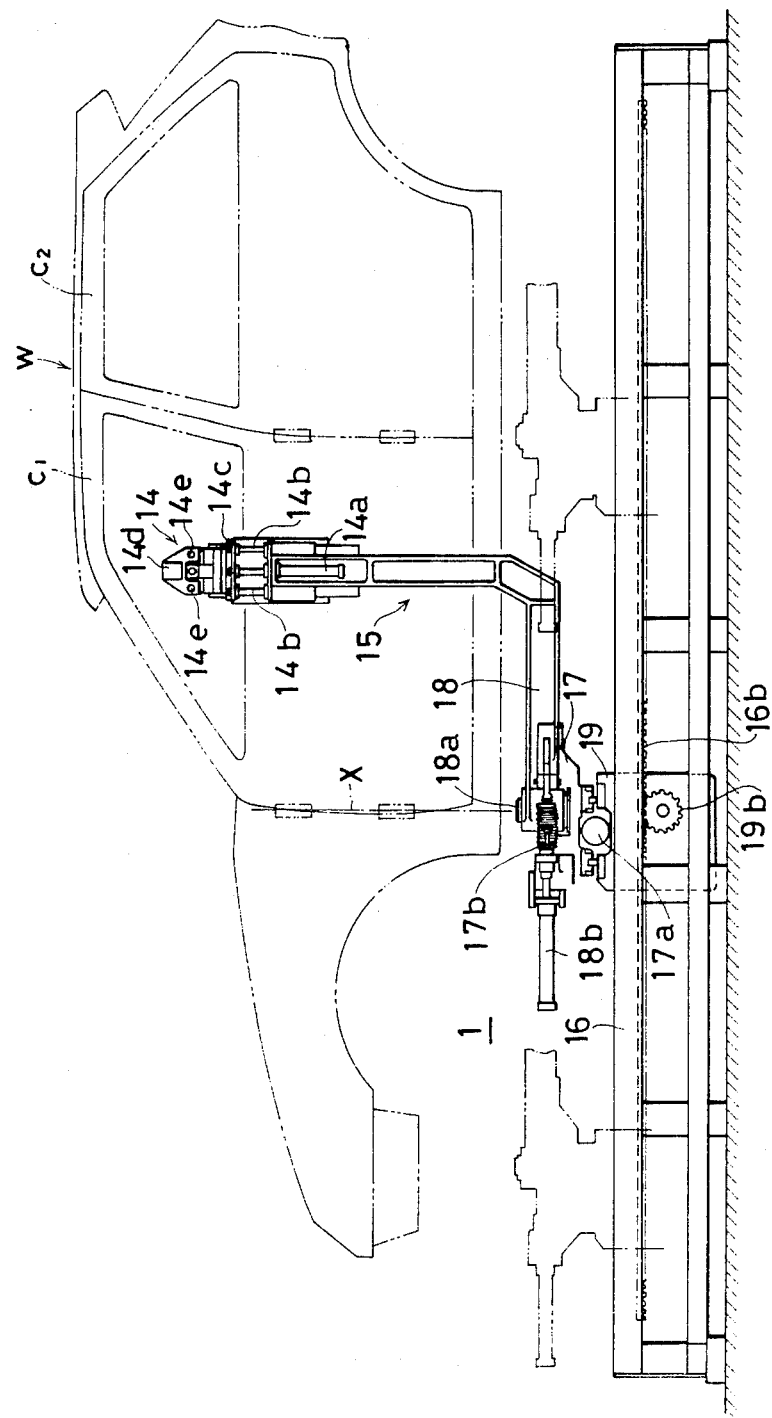
FIG. 8 is a side view of the same.

A detailed explanation with reference to FIGS. 7-9 is as follows:

The robot main body 17 is mounted on a movable table 19 supported on a pair of upper and lower rails 16a, 16a fixed to a front and rear directional long guide frame constituting the second rail means 16. The robot body 17 is movable forwards and rearwards, through the movable table 19. The robot body 17 has several positions along the rails. These are: (a) a waiting position near the forward end of the motorcar vehicle body W, (b) a front door opening and closing position just below the door hinge of the front door $c_1$ and (c) a rear door opening and closing position just below the door hinge of the rear door $c_2$. Additionally, the robot main body 17 is arranged to be movable to advance and retreat in the lateral directions along rails 19a, 19a provided on the movable table 19 by means of a cylinder 17a. Thus, the robot main body 17 may be set in position so that a shaft 18a for swing movement of the robot arm 18 may be brought in alignment with an axis X of the door hinge (FIG. 9). The movable table 19 is arranged to be movable forwards and rearwards by a pinion 19b meshed with a rack 16a fixed to the guide frame. The pinion 19b is rotated by a rotary actuator 19c mounted on the movable table 19.

The robot arm 18 is so constructed to be swingable inwards and outwards in a horizontal direction within a predetermined angular range defined by a pair of stoppers 17b, 17b provided on the robot main body 17. Additionally, the aforementioned hand member 14 comprises an elevating frame 14c which is on an upper end of the robot arm 18 and is movable upwards and downwards by a cylinder 14a. In addition, hand member 14 includes a pair of guide rods 14b, 14b, and a holder 14f which is provided on the elevating frame 14c to be movable to advance and retreat by a cylinder 14d and a pair of guide rods 14e, 14e. The foregoing engaging means 13, which is engageable with a window glass inserting groove of each door $c_1$, $c_2$ is attached to a forward end of the holder 14f. The engaging means 14 may be brought to engagement with or disengagement from the groove by operating the holder 14f and the elevating frame 14c. Thus, under the engagement of the engaging means 14 with the groove, each door $c_1$, $c_2$ may be opened by swinging the robot arm outwards.

Thus, as mentioned above, if the robot main body 17 is arranged to be moved forwards and rearwards through the space formed below the motorcar vehicle body W, the second railway means 16 is disposed closer to the vehicle body conveying passage 1, so that the space between the first railway means 11 disposed outside the railway means 16 and the conveying passage 1 is made small. Thus, when the vehicle body W is conveyed into the painting stage A, it becomes unnecessary that the painting robots $5_1$, $5_2$ are largely retreated sidewards so as not to interfere with the doors, as in the foregoing conventional case in which a motorcar vehicle body is conveyed thereinto with its doors kept opened. Also, this engagement has an advantage that the painting stage can be decreased in lateral space.

Additionally, the way the swingable shaft 18a of the robot arm 18 is brought into alignment with the axis X of the door hinge, the opening and closing operation of the door can be carried out without making a relative movement of the engaging means 13 in relation to the door, so that a coating film or the like can be prevented from scratching the vehicle body caused by the relative movement of the engaging means 13.

Figure 11:
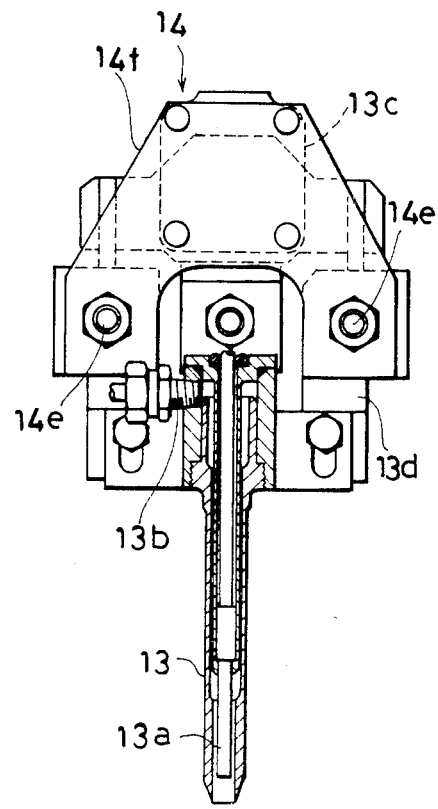
FIG. 11 is a sectional view taken along the line XI—XI in FIG. 10.

As shown in FIG. 11, the engaging means 13 is provided with a detecting means 13a for detecting the position of the window glass inserting groove. In the illustrated example, the detecting means 13a comprises a glass fiber means connected to a light detecting means (not illustrated) so that the position detecting may be carried out by utilizing the fact that the optical fiber detecting may be carried out by utilizing the fact that the optical fiber detecting means 13a does not receive any reflection light, when positioned just above the window glass inserting groove. Additionally, the engaging means 13 has air supplied to it from an air joint 13b provided on an upper end thereof. The air is blown out from an opening made in a lower end of the means 13 to prevent any paint from adhering thereto.

For engagement of the engaging means 13 with the window glass inserting groove, the robot arm 18 is, first, moved to such a predetermined initial point position that it does not interfere with the closed door or a slightly opened door. Thereafter, the engaging means 13 is moved to a position above the window glass inserting groove by moving the hand portion 14. The detecting means 13a detects the inserting groove. The engaging means 13 is lowered and is brought into engagement with, that is, inserted into the inserting groove. Then, the arm 18 is swung outwards to a predetermined full open position which opens the door. After completion of a predetermined painting operation, the arm 18 is moved to its predetermined full close position which is closer to the vehicle body W than the original position which results in the door being closed.

However, since the initial position of the arm 18 and the full close position of the arm 18 are different from one another, frequently due to differences in vehicle bodies, the door is closed during the swing movement of the arm 18 from the original position to the full close position. Thus, undue force is applied between the engaging means 13 and the closed door by the continued swing force of the arm 18, and the engaging means 13 or the like is damaged by that force.

Figure 10:
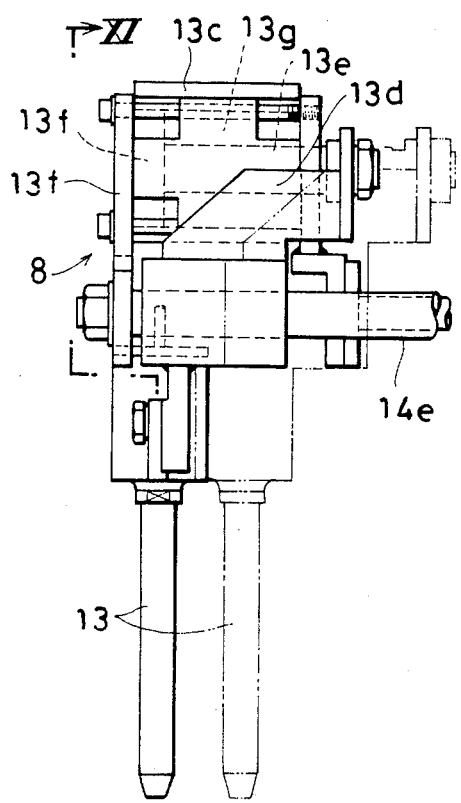
FIG. 10 is an enlarged front view of a forward end of a hand part thereof.

Accordingly, in the illustrated example, as shown in FIGS. 10 and 11, the engaging means 13 is attached to the holder 14f through an air cylinder 13c which is biased towards the door closing side, producing a shock absorbing function against an excessive external force acting on the engaging member 13.

In more detail, the air cylinder 13c is fixedly provided on a rear surface of the holder 14f. A supporting frame $13d$, having the engaging means 13 hung down therefrom, is slidably mounted, on the guide rods $14e$, $14e$ supporting the holder $14f$. A piston rod $13e$ projects rearwards from the air cylinder $13c$. The rod $13c$ is connected to the supporting frame $13d$ so that the engaging member 13 may be movable in relation to the holder $14f$, between an advanced position, which is biased towards the closing side of the door as shown by solid lines in FIG. 10, and a retreated position on a rear side as shown by imaginary lines in the same Figure. Air is introduced into a pressure chamber $13g$ on a rear side of a piston $13f$ in the air cylinder $13c$ to urge the engaging member 13 to be biased towards the advanced position.

With this arrangement, even if the door is closed during the swing movement of the robot arm 18 to its full open position, after closing of the door, the engaging means 13 is moved from the advanced position towards a retreated position compressing the air in the pressure chamber $13g$ of the air cylinder $13c$. Thus, the engaging means 13 moves in a retreat escape fashion preventing damage. An air piping connected to the pressure chamber $13g$ may be provided, as desired, with a relief valve interposed therein.

Figure 12:
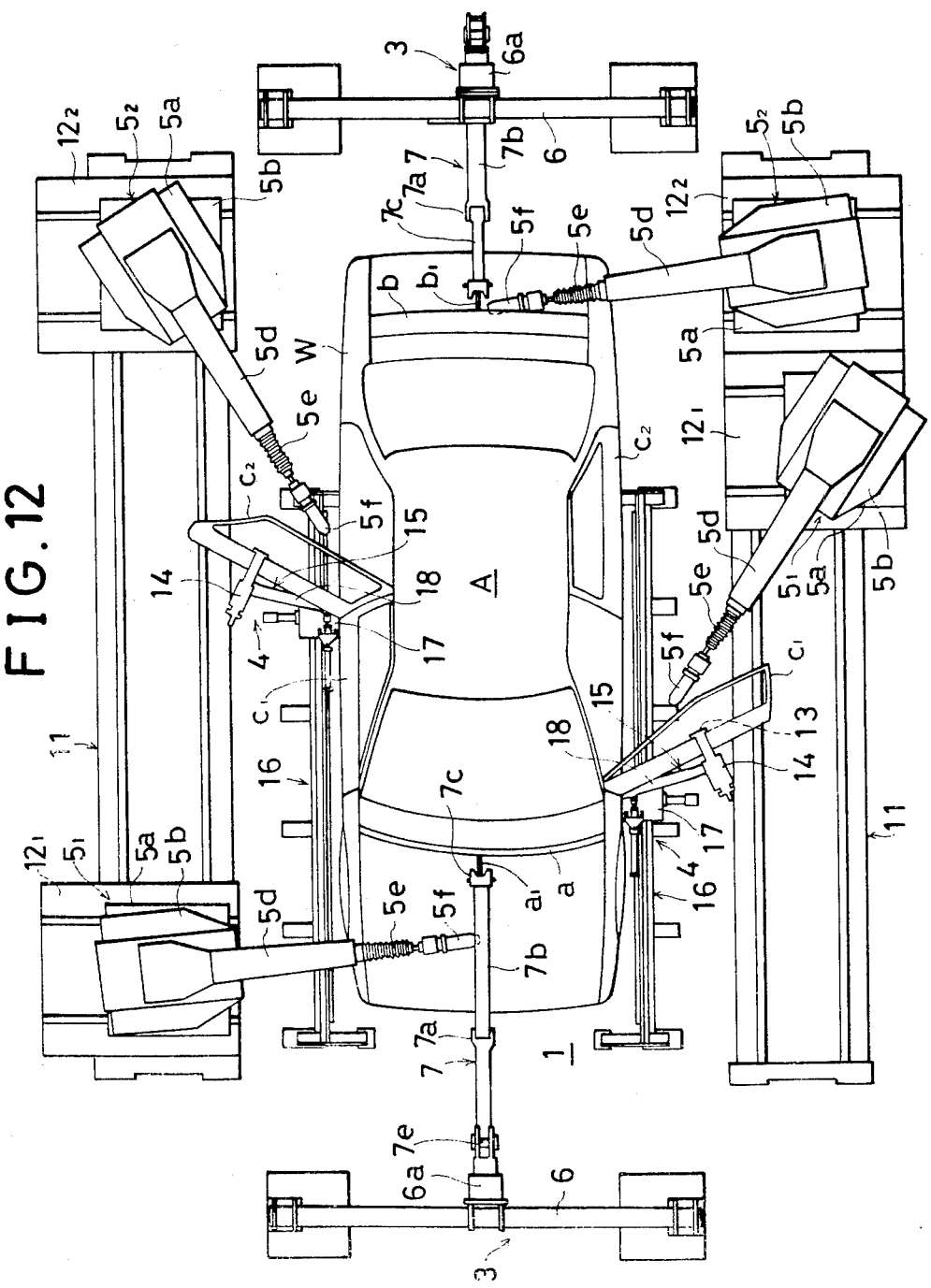
FIG. 12 is a top plan view of the painting stage in a first painting step and FIG. 13 is a top plan view of the painting stage in a second painting step.

Next, the painting process of this invention with the foregoing painting construction will be explained as follows:

First, the motorcar vehicle body W with its four doors closed is conveyed into the painting stage A by the conveyor 2 and is stopped at a predetermined position. Thereafter, the front lid a and the rear lid b are opened by the front and rear lid opening and closing means 3, 3. At the same time, as shown in FIG. 12, the robot main body 17 of the door opening and closing means 4 on the right side portion of the painting stage A is shifted to the rear door opening and closing position and the rear door $c_2$ on the right side of the vehicle body is opened thereby. Additionally, the front painting robot $5_1$ on the left side portion of the painting stage A is shifted to a rearward position of the front door $c_1$ of the left side of the vehicle body. The robot main body 17 of the door opening and closing means 4 on the left side portion is shifted to a front door opening and closing position thereof and opens the front door $c_1$.

Under this condition, half of an inner panel portion of the front regions of the vehicle body is painted. For example, the right half of the interior of the engine compartment and a left half of the inner surface of the front lid a is painted by the front painting robot $5_1$ on the right side portion of the painting stage A. In addition, the inner panel portion of a rear door region on the right side of the vehicle body including the inner surfaces of the rear door $c_2$ are painted by the rear painting robot $5_2$ on the right side portion. At the same time, the inner panel portion of the front door region on the left side of the vehicle body including the inner surface of the door $c_1$ and the vehicle body's trim portion exposed by the open door $c_1$ is painted by the front painting robot $5_1$ on the left side portion. Half of the inner panel portion of the rear region of the vehicle body is painted. For instance, the left half of the interior of the trunk compartment and the right half of the inner surface of the rear lid b is painted by the rear painting robot $5_2$ on the left side portion. Thus, the first painting step is completed.

Figure 13:
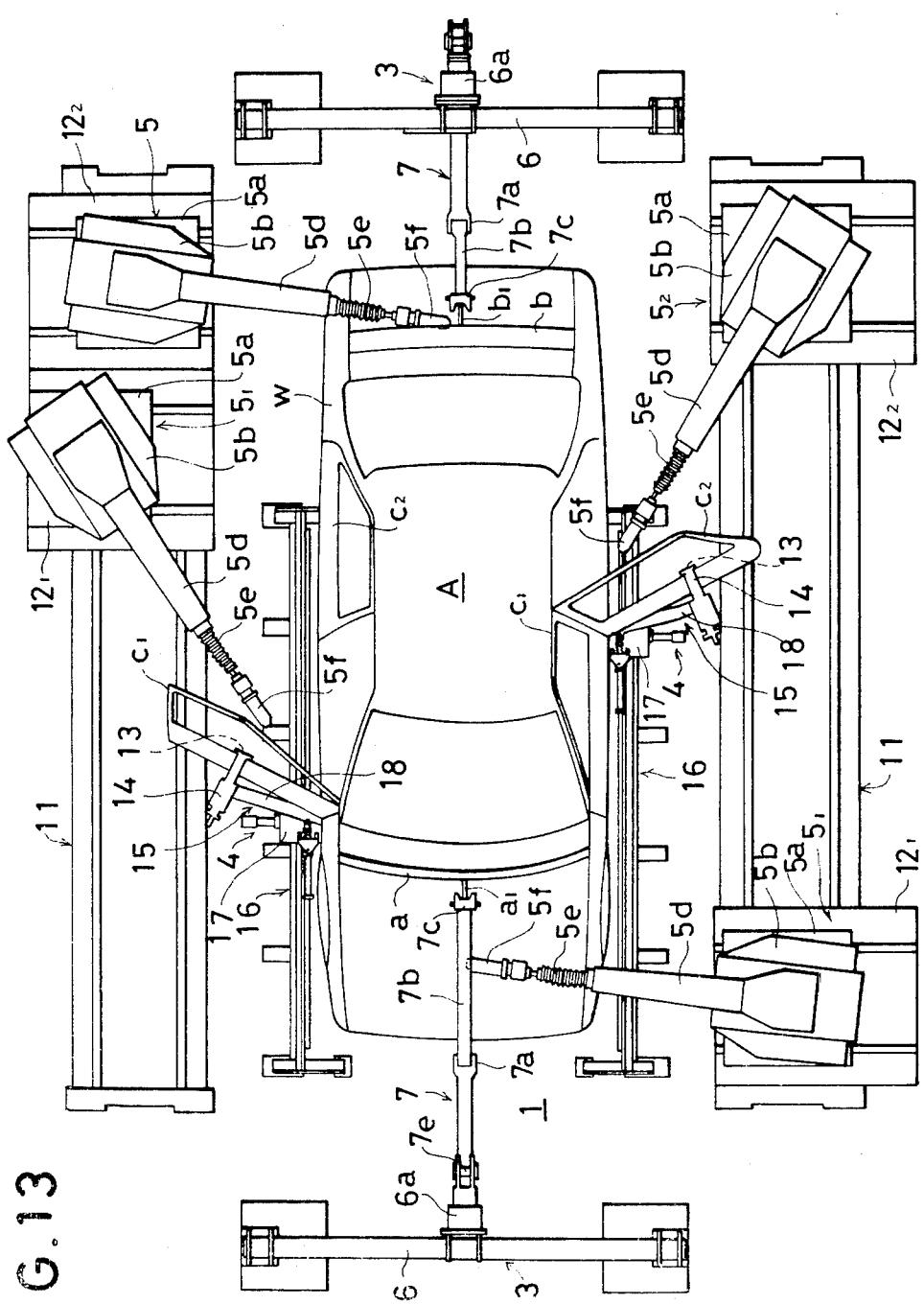

After completion of the first painting step, the rear door $c_2$ on the right side of the vehicle body and the front door $c_1$ on the left side are closed by their respective door opening and closing means 4, 4. The front painting robot $5_1$ on the right side portion is shifted to a rearward position of the front door $c_1$ on the right side. The front painting robot $5_1$ on the left side portion is shifted to a forward position of the left side front door $c_1$. Next, as shown in FIG. 13, the robot main body 17 of the door opening and closing means 4 on the right side portion is shifted to its front door opening and closing position to open the front door $c_1$ on the right side. The robot main body 17 of the door opening and closing means 4 on the left side portion is shifted to its rear door opening and closing position to open the rear door $c_2$ on the left side.

Under this condition, a second painting step is begun. First, an inner panel portion of the front door region on the right side of the vehicle body including an inner surface of the front door $c_1$ and the vehicle body's trim portion exposed by the open door $c_1$ is painted by the front painting robot $5_1$ on the right side portion. The remainder half of the inner panel portion of the rear region of the vehicle body, that is, the left half of the interior of the trunk compartment and the right half of the inner surface of the rear lid b are painted by the rear painting robot $5_2$ on the right side portion. The remainder half of the inner panel portion of the front region of the vehicle body, that is, the left half of the interior of the engine compartment and the right half of the inner surface of the front lid a, are painted by the front painting robot $5_1$ on the left side portion.

The inner panel portion of the rear door region on the left side of the vehicle body including the inner surface of the rear door $c_2$ and the vehicle body's trim portion exposed by the open door $c_2$ are painted by the rear painting robot $5_2$ on the left side portion.

After completion of the second painting step, the front door $c_1$ on the right side and the rear door $c_2$ on the left side are closed by their respective door opening and closing means 4, 4. Additionally, the front lid a and the rear lid b are closed by their respective lid opening and closing means 3, 3. The motorcar vehicle body W is conveyed out of the painting stage A by the conveyor 2. At the same time, the next new motorcar vehicle body W to be painted is conveyed into the painting stage A with its doors closed. Painting of the inner panel region of the new motor car vehicle body W is carried out by the same operation as mentioned above.

The above explanation has been for painting the inner panel region of a 4-door type motorcar, but painting an inner panel region of a 2-door type motorcar can also be carried out at the same painting stage A as described below.

Namely, in this case, the first painting step includes painting half of the inner panel portion of the front region of the vehicle body by the front painting robot $5_1$ on the right side portion. Also, the half of the inner panel portion of a right door region of the vehicle body including an inner surface of the right door and the vehicle body's trim portion exposed by the open right door is painted. For example, a rear half thereof is painted by the rear painting robot $5_2$ on the right side portion. The front half of an inner panel portion of the left door region of the vehicle body including an inner surface of the left door and the vehicle body's trim portion exposed by the open left door, for instance, a front half thereof, is painted by the front painting robot $5_1$ on the left side portion. the half of the inner panel portion of the rear region of the vehicle body is painted by the rear painting robot $5_2$ on the left side portion.

After completion of the first painting step, the left and right doors are closed by their respective door opening and closing means 4, 4. The front painting robot 5₁ on the right side portion is shifted to a rearward position of the right door. The front painting robot 5₁ on the left side portion is shifted to a forward position of the left door. Thereafter, the left and rear doors are reopened, and a second painting step takes place. The remainder half, that is, the front half of the inner panel portion of the right door region of the vehicle body is painted by the front painting robot 5₁ on the right side portion. The remainder half of the inner panel portion of the rear region of the vehicle body is painted by the rear painting robot 5₂ on the right side portion. The remainder half of the inner panel portion of the front region of the vehicle body is painted by the front painting robot 5₁ on the left side portion. The remainder half, that is, the rear half of the inner panel portion of the left door region of the vehicle body, is painted by the rear painting robot 5₂ on the left side portion.

Thus, according to this invention, in the painting stage A, the front lid, the rear lid and the doors of the vehicle body introduced therein are opened. The inner panel portions of the front and rear regions of the vehicle body and the inner panel portion of the door regions on both sides of the vehicle body are painted. Thus, it becomes unnecessary to exclusively provide an area for door opening and closing in the front and in the rear of the painting stage. Therefore, the length of the painting process line is shortened. In addition, the doors of the vehicle body are kept closed during conveying of the vehicle body and when the painting robots are shifted forwards and rearwards to their predetermined positions after completion of the first painting step, thus making it unnecessary to greatly retreat the painting robots. Thus, the painting stage can be decreased in lateral size.

Additionally, when the painting procedure is carried out while one of the front painting robots at the left and right side positions is painting the inner panel portion of the front region of the vehicle body, the other thereof is painting the inner panel portion of the door region of the vehicle body. Thus, the atomizers on the front ends of the two front painting robots are not brought so near to one another as to fall within the electrostatic repulsion generation range therebetween. The relation between the rear painting robots at the left and right side positions is such that it becomes unnecessary that the atomizers avoid approaching one another since one of the painting robots ceases its painting operation while the other is in operative condition as done in the conventional case. Thus, according to this invention process, the efficiency of painting robots is improved.

According to the first embodiment of this invention, the inner panel portion of the front door region of the vehicle body and the inner panel portion of the rear door region of the vehicle body on each side of a 4-door type motorcar are painted respectively by the front painting robot and the rear painting robot on each side portions of the painting stage. According to the second embodiment of this invention, the inner panel portion of the door region of the vehicle body on each side of a 2-door type motorcar is painted, by dividing the painting into halves by the front and rear painting robots on each side, so that the area to be painted by each painting robot will be equal, thus preventing a lowered operating efficiency of the painting robots and shortening the cycle time.

It is readily apparent that the above-described Background of the Invention meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A method of painting an inner panel region of a 4-door type motorcar vehicle body comprising the steps in the following sequence:

conveying a motorcar vehicle body with its doors closed into a painting stage;

opening a front hood of said vehicle body using a lid opening and closing means provided in the front of said painting stage;

opening a rear hood of a said vehicle body using a lid opening and closing means provided in the rear of said painting stage;

painting a half of an inner panel portion of a front region of said vehicle body using a front painting robot on one side portion of said painting stage, said inner panel portion of said front region including an inner surface of a front lid;

opening a rear door on one side of said vehicle body using a door opening and closing means on the said one side;

painting an inner panel portion of the rear door region on said one side of said vehicle body using a rear painting robot on said one side, said inner panel portion of said rear door region including an inner surface of a door and a door trim portion;

opening a front door on the other side of said vehicle body using a door opening and closing means on the said other side;

painting an inner panel portion of a front door region on the said other side of said vehicle body using a front painting robot on said other side, said inner panel portion of said front door region including an inner surface of said front door and said front door trim portion;

painting a half of an inner panel portion of a rear region of said vehicle body using said rear painting robot on said other side, said inner panel portion of said rear region includes an inner surface of a rear lid;

closing said open rear door on said one side of said vehicle body using said door opening and closing means on said one side;

closing said front door on said other side of said vehicle body using said door opening and closing means on said other side;

moving said painting robots forwards and rearwards to individual respective positions;

opening a front door on said one side of said vehicle body using said door opening and closing means on said one side;

painting the inner panel portion of said front door region on said one side of said vehicle body using said front painting robot on said one side;

painting the remaining half of the inner panel portion of said rear region of said vehicle body using said rear painting robot on said one side;

painting the remaining half of said inner panel portion of said front region of said vehicle body using said front painting robot on said other side;

opening a rear door on said other side of said vehicle body using said door opening and closing means on said other side; and painting an inner panel portion of said rear door region on said other side of said vehicle body using said rear painting robot on said other side.

2. A method of painting an inner panel region of a 2-door motor vehicle body comprising the steps in the following sequence:

conveying a motorcar vehicle body with its doors closed into a painting stage;

opening the front lid of said vehicle body using a front lid opening and closing means provided in the front of said painting stage;

opening a rear lid of said vehicle body using a rear lid opening and closing means provided in the rear of said painting stage;

opening a left door of said vehicle body using a left door opening and closing means;

opening a right door of said vehicle body using a right door opening and closing means;

painting half of an inner panel portion of the front region of said vehicle body using a front painting robot on one side, said inner panel portion of said front region including an inner surface of a front lid painting half of an inner panel portion of the door region on one side of said vehicle body using a rear painting robot on said one side, said inner panel portion of said door region including an inner surface of said door and a door trim portion;

painting half of the inner panel portion of the door region on the other side of said vehicle body using a front painting robot on said other side;

painting half of an inner panel portion of the rear region of said vehicle body using a rear painting robot on said other side, said inner panel portion of said rear region inlcuding an inner surface of a rear lid;

closing said right door using said right door opening and closing means;

closing said left door using said left door opening and closing means;

moving said painting robots on both sides of said vehicle body forwards and rearwards to a predetermined position;

opening said left door using said left door opening and closing means;

opening said right door using said right door opening and closing means;

painting the remaining half of said inner panel portion of said door region on one side of said vehicle body using said front painting robot on said one side;

painting the remaining half of said inner panel portion of the rear region of said vehicle body using said rear painting robot on said one side;

painting the remaining half of said inner panel portion of said front region of said vehicle body using said front painting robot on said other side; and painting the remaining half of said inner panel portion of said door region of said vehicle body on said other side using said rear painting robot on said other side.

3. A painting apparatus for painting an inner panel region of a motorcar vehicle body, said painting apparatus comprising:

a vehicle body conveying passage;

a painting stage provided in the midway of said vehicle body conveying passage;

a pair of front and rear lid opening and closing means for opening and closing a front lid and a rear lid of said vehicle body;

a door opening and closing means disposed on each of the left and right sides of said painting stage, said door opening and closing means selectively opening and closing a door;

a pair of front and rear painting robots movable forwards and rearwards for painting an inner panel portion of a front region of said vehicle body, an inner panel portion of a rear region of said vehicle body and an inner panel portion of a door region on each side of said vehicle body, said front region of said vehicle body including an inner surface of a front lid, said rear region of said vehicle body including an inner surface of a rear lid, and said door region on each side of said vehicle body including an inner surface of said door and a door trim portion; and a first railway means for moving said front and rear painting robots forwards and rearwards and a second railway means provided inside said first railway means, said door opening and closing means on each side being arranged to be movable forwards and rearwards along said second railway means.

4. A painting apparatus as claimed in claim 3, wherein said door opening and closing means on each side comprises a door opening and closing robot means having a hand portion means carrying an engaging member for engaging said doors.

5. A painting apparatus as claimed in claim 4, wherein said door opening and closing robot means comprises a robot main body means movable forwards and rearwards along said second railway means within a space formed below said motorcar vehicle body movable over said painting stage, a robot arm means raised from said robot main body means and in a nearly L-shaped, bent form and is swingable laterally in a horizontal direction, and a hand portion means provided on an upper end of said robot main body means having an engaging member for engaging said doors, wherein said robot main body means is settable in a position such that a first shaft means for swingably supporting said robot arm means may be brought into alignment with an axis of a door hinge of each door.

6. A painting apparatus as claimed in claim 4, wherein said engaging member is engageable with a window glass inserting groove of said doors, said engaging member including a detecting means for detecting the position of said inserting groove, wherein said engaging member is attached through an air cylinder means to said hand portion means and is biased towards a door closing side.

7. A painting apparatus as claimed in claim 3, wherein each of said front and rear lid opening and closing means includes an upward and downward swingable arm means, attached to a gate shaped machine frame means which transverses above said conveying passage, wherein a forward end of said arm means has a holding means for holding a handle member attached to an opening end of a corresponding said front lid or said rear lid.

8. A painting apparatus as claimed in claim 7, wherein said arm means is movable between an operative position with the holding means thereof positioned over said conveying passage and a retreated position with said holding means thereof positioned on a lateral side of said conveying passage.

9. A painting apparatus as claimed in claim 7, wherein said handle member has a detecting member attached thereto, and wherein said arm means has a detecting means which is operable in cooperation with said detecting member at an open position of said lid, said detecting means being attached to said arm means at a position near to the position where said holding member is attached to said arm means.

10. A painting apparatus as claimed in claim 7, wherein said holding means is opened and closed by a hydraulic actuator means, and wherein a second shaft means pivotally supports said holding means, said second shaft means being located at a position offset from an acting line of a reaction force from said handle member during a lid opening operation such that said holding means, due to the action of the reaction force, has such a moment for inclining said holding means about said second shaft means towards an opening side of said holding means, and said lid opening and closing means including a pressure responsive means for opening said holding means in response to an increase in a load pressure of said hydraulic actuator means above a predetermined value.

* * * * *